Feb. 5, 1963  W. JUNG ETAL  3,076,432
METHOD AND APPARATUS FOR PRESERVING AND TRANSPORTING LIVE FISH
Filed Aug. 28, 1961  2 Sheets-Sheet 1

INVENTORS
Werner Jung
BY George M. Pavell

Atty.

United States Patent Office 3,076,432
Patented Feb. 5, 1963

3,076,432
METHOD AND APPARATUS FOR PRESERVING AND TRANSPORTING LIVE FISH
Werner Jung, 9109 McVicker, Morton Grove, Ill., and George M. Pavell, 5758 S. Kostner Ave., Chicago 29, Ill.
Filed Aug. 28, 1961, Ser. No. 134,252
3 Claims. (Cl. 119—3)

Our invention relates in general to a method and apparatus for preserving and transporting live fish and more specifically to a device in which live fish may be stored and transported to the market with only a minimum amount of water being required and with only the minimum amount of handling of the fish being required from the time the fresh fish are placed in the device until they are sold to a customer in the market.

In order to accomplish the above we have provided a unit in which the fresh fish are placed in soft containers of plastic or similar material which are shaped so that the bottom and sides thereof generally conform to the shape and size of the fish. A circulating and purifying water system is provided for feeding fresh oxygenated water to each container to maintain a certain water level in each envelope. Each container or envelope is designed to hold a single fish of a certain size and each is slid over and removable from a water supply pipe which has perforations in the lower side to allow the proper amount of water to flow into the container. Each container has an outlet vent at one side thereof which causes excess water to overflow from the container and thus maintain a desired water level therein. The overflowing water is caught in a catch basin below the various containers and is pumped back into a storage tank above the unit. Water for the system is drawn from the storage tank through an atomizing nozzle where it is oxygenated and forced into a supply tank from which it is in turn fed to the perforated pipes in regulated amounts to supply the containers.

Having thus described the general aspects of our invention we will now describe the device in detail having reference to the accompanying two sheets of drawings in which:

Figure 1:
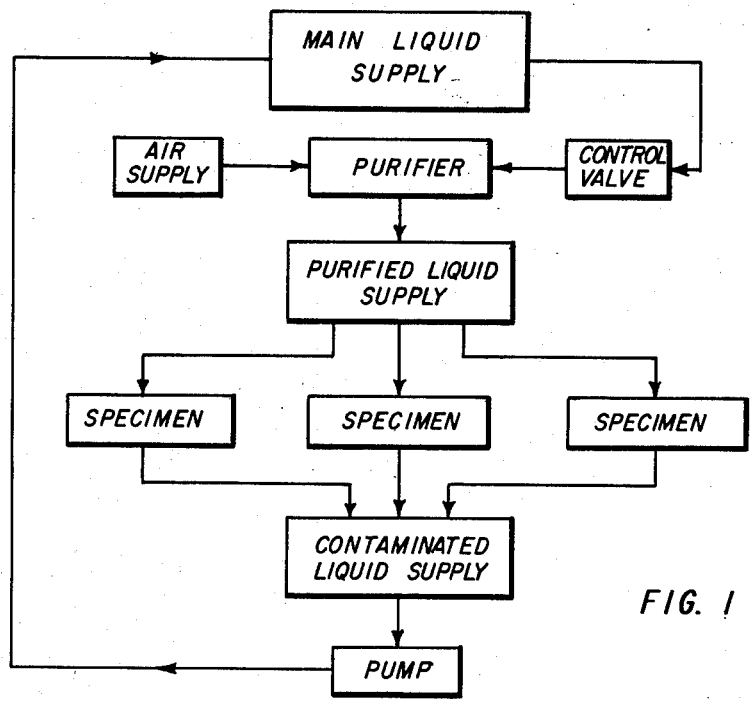
FIG. 1 is a chart showing the water circulating system.

Referring now to the drawings FIG. 1 shows in chart form the water circulating system illustrating how the water is fed from the main liquid supply at the top through a control valve to the purifier where the atomizing nozzle brings in a supply of fresh air under pressure which forces the water and air into the purified liquid supply tank. From this last tank the purified and oxygenated liquid is fed by separate pipes to each container holding a fish specimen. The overflow from each specimen container is drained into a contaminated liquid tank at the bottom of the rack and from this tank, a sump pump forces the liquid back up into the main liquid supply tank.

Figure 2:
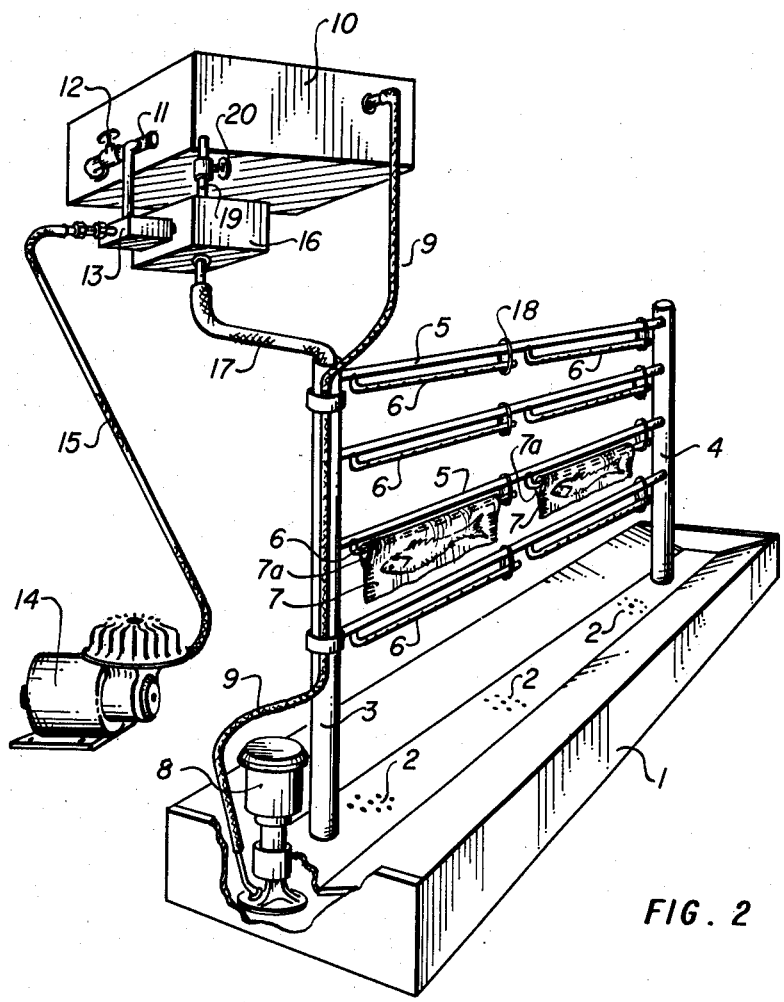
FIG. 2 is a diagrammatic illustration of the device, illustrating the method of packaging the fish, hanging the containers on a rack, and the water circulating system.

FIG. 2 illustrates the actual construction of the rack holding the various containers. The rack for supporting the various specimens comprises a base 1 in the form of a tank having perforated inlets at 2 into which the excess water dripping down from the various specimens is carried into tank 1. A pair of upright pipes 3 and 4 are supported in any manner in the upper surface of tank 1. The pipe 3 is the main supply pipe and is closed at its lower end and has a series of smaller branches 5 extending laterally therefrom to pipe 4. The pipes 5 are closed at the outer end and secured to pipe 4 which merely acts as a support. At various points there are further branch pipes 6 closed at their outer ends and with the inner ends communicating with the pipes 5. Each pipe 6 has a series of perforations along their lower sides thru which the water flows.

Figure 3:
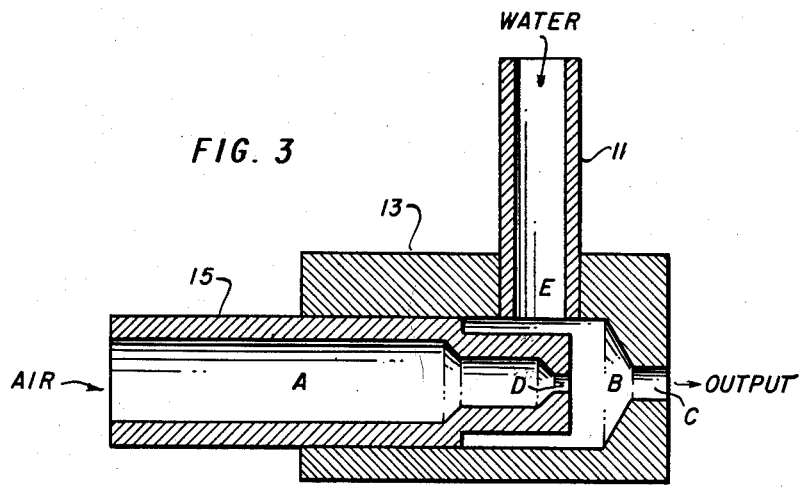
FIG. 3 is an enlarged detail view of the atomizing nozzle of FIG. 2.

Each fish container 7 is formed of soft plastic or like material and in the form of tubing which is partially sealed at both ends as shown, after a fish has been placed therein, to form a long loop extending lengthwise of the container. The containers are then placed in position by sliding the upper looped portion over one of the pipes 6 so that water flows from the perforations in pipe 6 into the container to practically cover the fish therein. At the upper left end of the container where the loop is formed an overflow outlet is provided at 7a so that excess water will be drained from the container and fall to the tank 1. The water from tank 1 is reclaimed by pump 8 and pumped thru pipe or hose 9 into main liquid supply tank 10. Water from tank 10 is fed thru outlet 11, with a valve 12 therein, to an atomizer nozzle 13. The details of such a nozzle 13 are shown in FIG. 3. Water is fed into the nozzle thru outlet 11 into channel E. Air is fed into chamber A from a compressor 14 (FIG. 2) thru hose 15. The air is further compressed and gains velocity as it passes through the reduced area vent D where it passes at high velocity into chamber B. The water is therefore atomized as it is forced out of nozzle C into the supply tank 16.

The fresh atomized water from supply tank 16 is then fed down through hose or pipe 17 to the main pipe 3, from which it is distributed thru the branch pipes 5 and into delivery pipes 6. A pipe 19 having a valve 20 may be used to relieve the air pressure in tank 16.

The delivery pipes 6 are bent outward slightly at their free ends so that the container loop may be readily slipped over the same from the outer ends and a loop of heavy wire or the like such as 18 slides on pipe 5 and is looped over the outer end of a pipe 6 after the container has been placed thereon, to lock the container in place and to help support the free end of pipe 6.

While we have not shown any support for tanks 10 and 16 it will be understood that these may be supported by brackets secured to tank 1 or by any other form of supports. Also while we have shown but one rack formed by pipes 3, 4, 5 and 6 it will be understood that there may be any number of such racks mounted parallel to each other and fed from the same tanks. Such units may also be arranged so that the whole unit, including as many racks as desired, may be loaded on trucks or freight cars for shipment and that it may be unloaded as a unit at a market so that the fish may be untouched from the time they are placed in a container and hung on the rack until they are sold at a market. Each container continuously receives fresh oxygenated water and the overflow vent maintains the water level at a desired point by draining off water above that level.

Having fully described and ascertained the features and aspects of our invention what we consider to be new and desire to have protected by United States Letters Patent will be pointed out in the appended claims.

What we claim is:

1. A rack for supporting a series of containers each containing a live fish, said rack comprising a series of supply pipes carrying freshly atomized water, a series of branched off feed pipes extending laterally from each supply pipe and having openings in the lower sides thereof discharging said fresh water, a series of containers formed of plastic in the shape of an envelope conforming generally in shape to the shape of a fish enclosed therein, each container having a loop over the top thereof forming an opening through which one of said feed pipes is inserted to support the container and feed water into the container, and a vent in one side near the top of the container formed at one end of said loop to drain off the surplus water therein and maintain a desired water level therein, each container receiving its own fresh supply of water through its individual feed pipe.

2. A rack such as claimed in claim 1 having a fresh water tank linked to said pipes to supply water thereto, a catch basin for receiving the overflow water from said containers, an atomizer nozzle, a pump for pumping the water from said catch basin through said nozzle and back to said fresh water tank.

3. A device for transporting live fish comprising a water circulating system including a rack formed of water pipes supported on a tank base, a storage water tank, a fresh water tank, a series of substantially flat vertical containers each formed as an envelope of soft plastic holding a single fish, an atomizer connected between the storage tank and the fresh water tank and effective to draw water from the storage tank, atomize the water and deliver it to the fresh water tank and then to the water pipes of the rack, a series of branch delivery pipes branched off from the pipes of the rack, each branch pipe supporting one of said containers holding a fish, an overflow vent in one end of each container for draining off excess water from each container into said tank base, and a pump connected to said water circulating system for recirculating water from the base tank to the storage tank, each branch delivery pipe feeding fresh water individually to its supported container, the overflow from each container fed directly to said base without passing through any other container.

References Cited in the file of this patent
UNITED STATES PATENTS

| | | |
|---|---|---|
| 884,140 | Erlwein | Apr. 7, 1908 |
| 1,248,169 | Schnoor | Nov. 27, 1917 |
| 2,091,695 | Thuma | Aug. 31, 1937 |
| 2,680,424 | Brown | June 8, 1954 |
| 2,949,882 | Thomas | Aug. 23, 1960 |